No. 699,328. Patented May 6, 1902.
A. P. JOHNSTONE.
WEIGHING AND MEASURING MACHINE.
(Application filed Aug. 9, 1901.)
(No Model.)
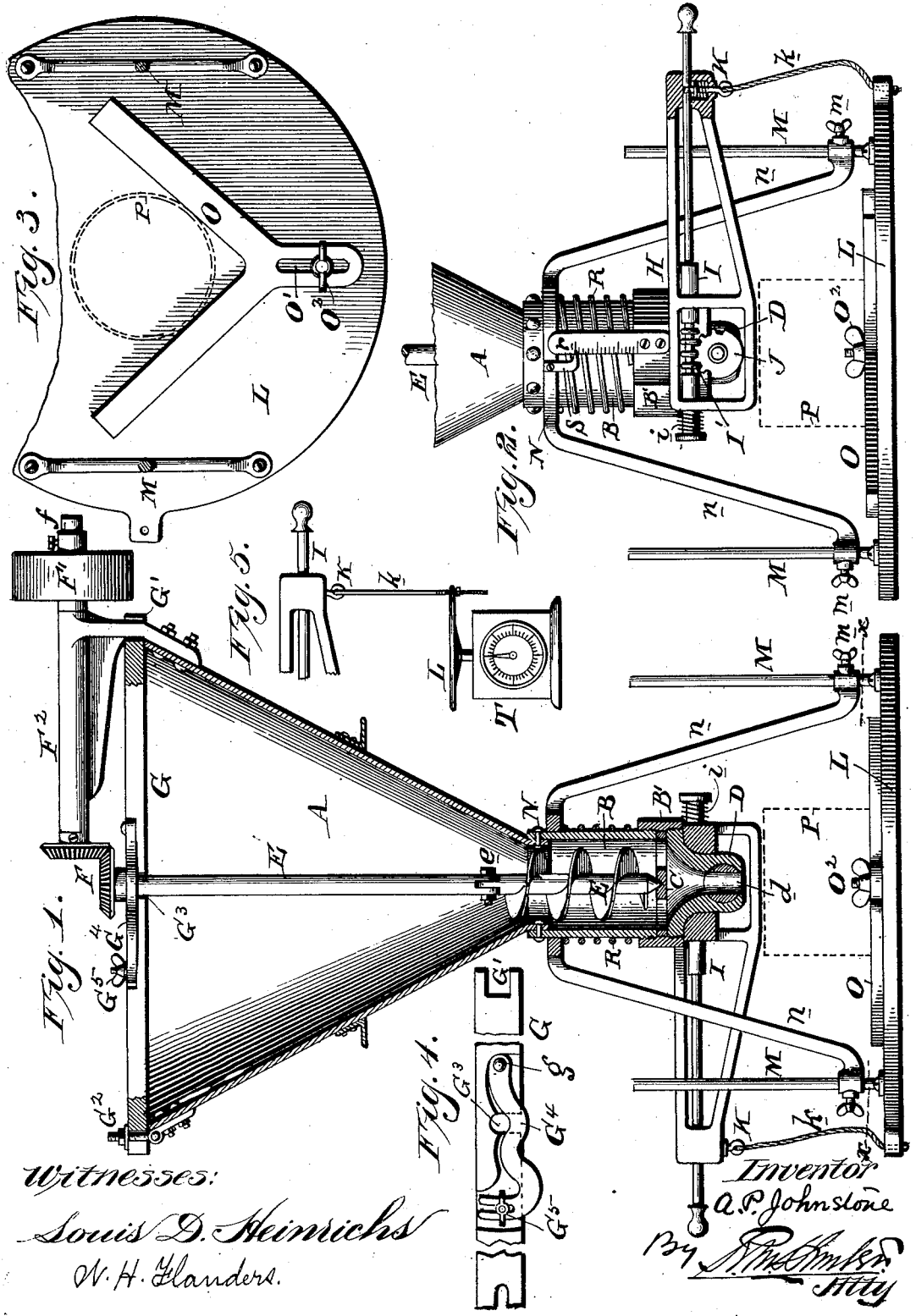
Witnesses:
Louis D. Heinrichs
N. H. Flanders.
Inventor
A. P. Johnstone
By
Atty

UNITED STATES PATENT OFFICE.

ANTOINE P. JOHNSTONE, OF GIBBSBORO, NEW JERSEY, ASSIGNOR OF ONE-HALF TO GEORGE A. McALLISTER, OF GIBBSBORO, NEW JERSEY.

WEIGHING AND MEASURING MACHINE.

SPECIFICATION forming part of Letters Patent No. 699,328, dated May 6, 1902.

Application filed August 9, 1901. Serial No. 71,454. (No model.)

*To all whom it may concern:*

Be it known that I, ANTOINE P. JOHNSTONE, of Gibbsboro, county of Camden, and State of New Jersey, have invented an Improvement in Weighing and Measuring Machines, of which the following is a specification.

My invention has reference to devices for weighing and measuring paint and substances of like composition; and it consists of certain improvements, which are fully set forth in the following specification and shown in the accompanying drawings, which form a part thereof.

The object of my invention is to provide a means by which paints and other substances may be accurately and quickly weighed and measured, the said operations taking place automatically.

In carrying out my invention I provide a hopper from which paints or other material is positively fed downward by means of a feeding-screw into and through an automatic valve, the latter being controlled by the weight of the vessel and contents, whereby when it is filled to the proper degree the valve is released and automatically closes. The valve is constructed so as to avoid dripping after being closed. The feeding mechanism is especially designed so as to be easily removable from the apparatus without dismantling the same for the purpose of proper cleansing when necessary due to the changing of the color or character of the material. The receptacle to be filled is supported upon a movable platform, which may have capacity for adjustment to suit cans or vessels of different heights. This platform may be spring-supported upon the apparatus itself or may be carried, as is customary, on any ordinary weighing-scale mechanism and is adapted to control the valve, as will be more fully understood by the description hereinafter given.

My invention comprehends many details of construction, all of which will be better understood by reference to the drawings, in which—

Figure 1 is a vertical section of my improved apparatus complete. Fig. 2 is a front elevation of the lower portion of same. Fig. 3 is a sectional plan view of same on line X X, showing more particularly the platform and means of centralizing the can. Fig. 4 is a plan view of the bearing-bar for the shaft of the feeding mechanism, and Fig. 5 is a detail view showing the adaptation of my invention to an ordinary weighing-scale.

A is a hopper into which the material to be measured and weighed is placed. This hopper terminates at the bottom in a tubular extension or feeding-tube. Arranged below the feeding-tube is the valve-body D, containing the rotating valve $d$. The said valve-body is connected to the feeding-tube by a sleeve-coupling B'. Arranged within the sleeve-coupling and clamped between the feeding-tube B and the valve-body D is a perforated step-plate C, forming a bearing for the body of the shaft of the feeding-screw E, which is arranged within the feed-tube B. The feeding-screw E is driven by a shaft E', which is rotated by a shaft $f$ by means of bevel-gears F'. The shaft $f$ is journaled in a bearing $F^2$, secured to the upper part of the hopper A, and is provided with a band-wheel F', by which it is rotated.

As it is important to be able to readily remove the feed-screw E for cleansing, I employ the following construction: The shaft E' is hinged to the feed-screw at $e$, and the upper end of the shaft E' is journaled in a bearing $G^3$ on a cross or bearing bar G and is held in said bearing by means of the locking-plate $G^4$, hinged at one end $g$ to bearing-bar and clamped in position at the other end by a clamp $G^5$. The bearing-bar G is notched at one end, as at G', to fit about the base of the bearing $F^2$, and the other end is held down to the top of the hopper by means of a clamping-nut $G^2$. To remove the feeding-screw, it is only necessary to release the clamping-plate $G^4$ and turn it outward. The shaft E' may then be drawn to one side and the feeding-screw E lifted out. After being cleansed and the interior of the hopper and feeding-tube also cleansed the said feed-screw and its shaft may be again inserted by reversing the above operation.

The valve $d$ discharges directly into the can or vessel P, supported upon a vertical movable platform L, and the bottom of the valve-body D is made flush with the surface of the valve-plug $d$, so that as the valve is revolved to shut off the flow of the material the cut-off is clean and there is no chamber or nozzle at the bottom of the valve to contain the paint or material and permit it to continue to flow. This is very important, as it is necessary that no paint shall drip upon the outer portion of the can or upon the supporting-platform. The can is centered by being pushed against an angular guide O, said guide being clamped upon the table L by means of a hand nut or bolt working in connection with a slot O' in the guide-piece. (Shown in Fig. 3.) By adjusting the guide cans of any diameter may be centrally guided on the platform or otherwise, so as to bring the opening in the can or vessel directly under the discharge-orifice of the valve. This character of guide will centralize cans of very great difference in diameters and is very simple and inexpensive in construction.

The valve is automatic so far as its closing operation is concerned, and this is important, since it should shut off the flow of the paint the instant the proper weight of the material has been received in the can. The means for automatically operating the valve is as follows: A frame H is attached to the body of the valve and supports a longitudinally-reciprocating shaft I, provided with annular flanges or teeth I', and is moved in one direction under the action of a coil-spring $i$. The teeth I' of the said shaft mesh with the teeth of a segmental gear J on the end of the valve-plug $d$, so that under the action of the said shaft the plug is rotated in either direction—namely, to turn on the flow or to shut it off. The end of the shaft is provided with a knob or handpiece for pulling it in a direction opposite to the action of the spring $i$ and for the purpose of opening the valve. When pulled in that direction, the contents are retained by a spring-detent K, said detent being connected by a connection $k$, preferably flexible, with the movable platform L, so that when the said platform descends under the weight of the can and its contents the detent is automatically tripped at the proper moment and the spring $i$ permitted to come into action to reciprocate the shaft I, and thereby shut off the valve with rapidity. It is quite evident that the minor details of the means for operating the valve may be greatly modified, since the important feature is means to open the valve by hand-power and automatic means to close the valve controlled by the weight of the can or vessel being filled.

The platform L may be a part of the apparatus in the sense that it is sustained directly by it, as shown in Figs. 1 and 2, or it may be an independent structure having its support on the table or counter by being made in the form of a scale of any usual construction, but having the combination with the remaining apparatus by its location and through the tripping connection, as indicated diagrammatically in Fig. 5. In this latter figure the platform L is shown as supported upon an ordinary scale mechanism T, which is commonly constructed with a spring or a weight-counterbalance and is so well known that it needs no further description. In the other figures the supporting-platform is spring-sustained in the following manner: The platform is provided with upright rods M, to which are clamped at $m$ in an adjustable manner the ends of the downwardly-extending arms $n$, the upper ends of said arms being integral or secured to the annular or ring piece N. This piece N is guided about feed-tube B and is supported by a spring R. A suitable scale and pointer $r$, Fig. 2, may be employed to indicate the weight sustained by the platform L. This scale is not necessary, as the machine may be set or adjusted in the first instance by applying given or known weights on the platform L. If the scale is employed, then the adjustment of the connection $k$ should be such that it just trips the detent when the platform is depressed to the proper amount indicated on the scale and which is to correspond to the amount of the material to be placed in the can. The connecting part $k$ may be a cord or chain, as indicated in Figs. 1 and 2, or it may be a rod with a nut, as indicated in Fig. 5, to permit ready adjustment when desired.

The platform L may be raised or lowered upon the supporting-arms $n$ and secured rigidly thereto by the clamps $m$ to suit cans of different heights; but of course it is evident that this is not essential, as the platform could be made sufficiently low to suit all cans and a light supporting-box placed upon the platform under the cans of shorter height where it is desired to bring the mouth of the can close up to the valve; but I prefer to have the adjustable feature as being more mechanical and satisfactory.

While I prefer the construction shown, I do not limit myself to the details thereof, as these may be modified in various ways without departing from the spirit of the invention.

Having described my invention, what I claim as new, and desire to secure by Letters Patent, is as follows:

1. In a device for weighing and measuring paints, &c., the combination of a hopper having at the bottom a feeding-tube, a valve arranged below the feeding-tube, a feeding-screw arranged in the feeding-tube, an upright shaft for rotating the feeding-screw jointed to the screw within the hopper so as to be capable of being turned at an angle to the screw, a bearing at the upper part of the hopper for holding the upright shaft in position and having means for liberating the shaft therefrom, and power devices for rotating said upright shaft forming a detachable connection with said shaft, whereby the latter may be liberated and drawn to one side for the purpose of removing the feeding-screw.

2. In a device for weighing and measuring paints, &c., the combination of a hopper having at the bottom a feeding-tube, a valve arranged below the feeding-tube, a feeding-screw arranged in the feeding-tube, an upright shaft for rotating the feeding-screw jointed to the screw within the hopper so as to be capable of being turned at an angle to the screw, a bearing at the upper part of the hopper for holding the upright shaft in position and having means for liberating the shaft therefrom, and power devices consisting of a horizontal power-shaft carried in fixed bearings, and bevel-gears connecting the said horizontal power-shaft with the upright shaft for rotating said upright shaft and forming a detachable connection with said shaft, whereby the latter may be liberated and drawn to one side for the purpose of removing the feeding-screw.

3. In a device for weighing and measuring paints, the combination of a hopper having at the bottom a feeding-tube, a valve arranged below the feeding-tube, a feeding-screw arranged in the feeding-tube, an upright shaft for rotating the feeding-screw jointed to the screw within the hopper so as to be capable of being turned at an angle to the screw, a bearing at the upper part of the hopper for holding the upright shaft in position and having means for liberating the shaft therefrom, power devices for rotating said upright shaft forming a detachable connection with said shaft whereby the latter may be liberated and drawn to one side for the purpose of removing the feeding-screw, a movable platform for carrying the receptacle to be filled, an adjustable support to permit the platform to rise or fall, automatic means for closing the valve upon the proper depression of the platform, and actuating means between the platform and the automatic means for closing the valve.

4. In a device for weighing and measuring paints, &c., the combination of a hopper having at the bottom a feeding-tube, a valve arranged below the feeding-tube, a feeding-screw arranged in the feeding-tube, an upright shaft for rotating the feeding-screw jointed to the screw within the hopper so as to be capable of being turned at an angle to the screw, a bearing at the upper part of the hopper for holding the upright shaft in position and having means for liberating the shaft therefrom, power devices for rotating said upright shaft forming a detachable connection with said shaft whereby the latter may be liberated and drawn to one side for the purpose of removing the feeding-screw, hand-controlled means for opening the valve, a spring to close the valve, a detent or latch carried with the valve-body to hold the valve in its open position, a flexible or yielding connection to operate the detent, and a counterbalanced platform upon which the vessel to be filled is to be placed adapted to move the yielding connection to operate the detent or latch for the purpose of closing the valve upon the depression of said platform under the weight of the filled receptacle or vessel.

5. In a device for weighing and measuring paints, &c., the combination of a hopper for receiving material terminating at the bottom in a downwardly-extending feeding-tube having a reduced nozzle end, a valve in the end of the tube having a small orifice relatively to the area of the feeding-tube, a feeding-screw within the feeding-tube and substantially fitting it for forcing the material through the small valve-orifice, means for operating the feeding-screw, hand devices for opening the valve, an automatic spring device for closing the valve, a latch or detent for holding the valve in open position, and a counterbalanced platform for sustaining a removable vessel to be filled adapted to operate the latch or detent to close the valve under the weight of the material delivered to the receptacle on the platform.

6. In a device for weighing and measuring paints, &c., the combination of a hopper for receiving material terminating at the bottom in a feeding-tube, a valve below the tube, a feeding-screw within the feeding-tube, means for operating the feeding-screw, hand devices for opening the valve, automatic mechanical devices for closing the valve, a latch or detent for holding the valve in an open position, a counterbalanced platform for sustaining the vessel to be filled adapted to operate the latch or detent to close the valve under the weight of the material delivered to the receptacle on the platform, a spring surrounding the feeding-tube, a supporting-frame carried by said spring, and a connection between said frame and the platform.

7. In a device for weighing and measuring paints, &c., the combination of a hopper for receiving material terminating at the bottom in a feeding-tube, a valve below the tube, a feeding-screw within the feeding-tube, means for operating the feeding-screw, hand devices for opening the valve, automatic mechanical devices for closing the valve, a latch or detent for holding the valve in an open position, a counterbalanced platform for sustaining the vessel to be filled adapted to operate the latch or detent to close the valve under the weight of the material delivered to the receptacle on the platform, a spring surrounding the feeding-tube, a supporting-frame carried by the said spring, and an adjustable connection between said frame and the platform for the purpose of suiting cans or vessels of different heights.

8. In a device for weighing and measuring paints, &c., the combination of a hopper for receiving material terminating at the bottom in a feeding-tube, a valve below the tube, a feeding-screw within the feeding-tube, means for operating the feeding-screw, hand devices for opening the valve, automatic mechanical devices for closing the valve, a latch or detent for holding the valve in an open position, a counterbalanced platform for sustaining the vessel to be filled adapted to operate the latch or detent to close the valve under the weight of the material delivered to the receptacle on the platform, and an adjustable guide on the platform consisting of two arms at an angle at each other adjustable to or from the center of the platform and under the valve between which arms the cans or vessels are placed and centrally guided.

9. In a device for weighing and measuring paints, &c., the combination of a hopper terminating at the bottom in a valve-body, and a rotating valve-plug fitted to the body and having its circumferential surface at the bottom substantially on a line with the lower orifice of the valve-body whereby the dripping of the material after the valve is closed is avoided.

10. In a device for weighing and measuring paints, &c., the combination of a hopper terminating at the bottom in a valve-body, a rotating valve-plug fitted to the body and having its circumferential surface at the bottom substantially on a line with the lower orifice of the valve-body whereby the dripping of the material after the valve is closed is avoided, hand devices for opening the valve, mechanical devices for closing the valve, a latch or detent for holding the valve open, a movable support for the receptacle to be filled arranged below the valve, and connecting means between the movable support and the latch or detent.

In testimony of which invention I have hereunto set my hand.

A. P. JOHNSTONE.

Witnesses:
R. M. HUNTER,
J. W. KENWORTHY.